United States Patent
Moon et al.

(10) Patent No.: US 10,411,880 B2
(45) Date of Patent: Sep. 10, 2019

(54) APPARATUS AND METHOD FOR ENCRYPTION

(71) Applicants: SAMSUNG SDS CO., LTD., Seoul (KR); CARMEL HAIFA UNIVERSITY ECONOMIC CORP. LTD., Haifa (IL); BAR-ILAN UNIVERSITY, Ramat Gan (IL)

(72) Inventors: Duk-Jae Moon, Seoul (KR); Ji-Hoon Cho, Seoul (KR); Kyu-Young Choi, Seoul (KR); Nathan Keller, Ramat Gan (IL); Orr Dunkelman, Haifa (IL); Itai Dinur, Haifa (IL)

(73) Assignees: SAMSUNG SDS CO., LTD., Seoul (KR); CARMEL HAIFA UNIVERSITY ECONOMIC CORP. LTD., Haifa (IL); BAR-ILAN UNIVERSITY, Ramat Gan (IL)

( * ) Notice: Subject to any disclaimer, the term of this patent is extended or adjusted under 35 U.S.C. 154(b) by 588 days.

(21) Appl. No.: 15/050,930

(22) Filed: Feb. 23, 2016

(65) Prior Publication Data

US 2017/0126395 A1 May 4, 2017

(30) Foreign Application Priority Data

Oct. 29, 2015 (KR) .......................... 10-2015-0151038

(51) Int. Cl.
*H04L 9/06* (2006.01)
*H04L 9/08* (2006.01)
*H04L 9/00* (2006.01)

(52) U.S. Cl.
CPC ............ *H04L 9/0618* (2013.01); *H04L 9/002* (2013.01); *H04L 9/0869* (2013.01); *H04L 2209/16* (2013.01)

(58) Field of Classification Search
CPC ... H04L 9/0618; H04L 9/002; H04L 2209/16; H04L 9/0869
USPC .......................................................... 380/28
See application file for complete search history.

(56) References Cited

U.S. PATENT DOCUMENTS

| | | | |
|---|---|---|---|
| 5,623,548 A | * | 4/1997 | Akiyama ................ H04L 9/002 380/28 |
| 9,654,280 B2 | | 5/2017 | Michiels et al. |

FOREIGN PATENT DOCUMENTS

| | | |
|---|---|---|
| KR | 10-2007-0086509 A | 8/2007 |
| KR | 10-2012-0030335 A | 3/2012 |

OTHER PUBLICATIONS

Communication dated May 22, 2007 by the Korean Intellectual Property Office in counterpart Korean Patent Application No. 10-2015-0151038.

(Continued)

*Primary Examiner* — William S Powers
*Assistant Examiner* — Aubrey H Wyszynski
(74) *Attorney, Agent, or Firm* — Sughrue Mion, PLLC (57) ABSTRACT

Disclosed are an apparatus and a method for encryption. The apparatus includes, a key table generation unit configured to generate random values derived from a seed value and generate a key table including the generated random values, and an encryption unit configured to encrypt a plain text data block by generating an encryption algorithm by repeatedly combining the generated key table with a permutation function in a crossing manner, and using the generated encryption algorithm.

25 Claims, 6 Drawing Sheets

(56) References Cited

OTHER PUBLICATIONS

Man-Young Lee et al., "Modern Cryptography and Applications", KIISC Press, vol. 3, Nov. 25, 2002, 15 pages.
Communication dated Feb. 26, 2018, issued by the Korean Intellectual Property Office in counterpart Korean application No. 10-2015-0151038.

* cited by examiner

APPARATUS AND METHOD FOR ENCRYPTION

CROSS-REFERENCE TO RELATED APPLICATION

This application claims priority to and the benefit of Korean Patent Application No. 10-2015-0151038, filed on Oct. 29, 2015, the disclosure of which is incorporated herein by reference in its entirety.

BACKGROUND

1. Field

The present disclosure relates to technology of encryption.

2. Discussion of Related Art

A conventional white box cipher algorithm, which is provided with an implementation method thereof varied with internal characteristics of a symmetric key cipher algorithm that serves as an underlying algorithm, exhibits difficulty in providing a wide use due to its dependency on the underlying algorithm, and has an efficiency tens of times lower than the underlying algorithm due to an insertion of a number of additional operations to protect a cryptographic key of the underlying algorithm.

In addition, the conventional white box cipher algorithm does not provide sufficient security desired by a designer, and is exposed to the risk of real-time cryptographic key recovery attack.

SUMMARY

The present disclosure is directed to an apparatus and method for encryption.

According to an aspect of the present disclosure, there is provided an apparatus for encryption, the apparatus including a key table generation unit configured to generate random values derived from a seed value and generate a key table including the generated random values, and an encryption unit configured to encrypt a plain text data block by generating an encryption algorithm by repeatedly combining the generated key table with a permutation function in a crossing manner, and using the generated encryption algorithm.

The seed value may be an initial input value that is represented as a bit string.

The seed value may be one of a cryptographic key, a counter value, and an initialization vector.

The key table generation unit may determine sizes of the random values based on a size of an available memory for encryption.

The encryption unit may repeatedly combine the key table with the permutation function in a crossing manner based on an Even-Mansour scheme in which a key value is substituted for the key table.

The encryption unit may generate the encryption algorithm by repeatedly combining r+1 key tables (r is an integer and r≥1) with r permutation functions in a crossing manner.

The r+1 key tables may be all identical to each other.

The r+1 key tables may be all different from each other.

The r+1 key tables may be partly different from each other.

The r permutation functions may be all identical to each other.

The r permutation functions may be all different from each other.

The r permutation functions may be partly different from each other.

The permutation function may be a block cipher algorithm.

According to another aspect of the present disclosure, there is provided a method for encryption, the method including generating random values derived from a seed value, generating a key table including the generated random values, generating an encryption algorithm by repeatedly combining the generated key table with a permutation function in a crossing manner, and encrypting a plain text data block by using the generated encryption algorithm.

The seed value may be an initial input value that is represented as a bit string.

The seed value may be one of a cryptographic key, a counter value, and an initialization vector.

In the generation of the random values, sizes of the random values may be determined based on a size of an available memory for encryption.

In the generating of the encryption algorithm, the key table may be repeatedly combined with the permutation function in a crossing manner based on an Even-Mansour scheme in which a key value is substituted for the key table.

In the generating of the encryption algorithm, the encryption algorithm may be generated by repeatedly combining r+1 key tables (r is an integer and r≥1) with r permutation functions in a crossing manner.

The r+1 key tables may be all identical to each other.

The r+1 key tables may be all different from each other.

The r+1 key tables may be partly different from each other.

The r permutation functions may be all identical to each other.

The r permutation functions may be all different from each other.

The r permutation functions may be partly different from each other.

The permutation function may be a block cipher algorithm.

According to another aspect of the present disclosure, there is provided a computer program stored in a recording medium to execute operations in combination with hardware, the operations including generating random values derived from a seed value, generate a key table including the generated random values, generating an encryption algorithm by repeatedly combining the generated key table with a permutation function in a crossing manner, and encrypting a plain text data block by using the generated encryption algorithm.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present disclosure will be described in detail below with reference to the accompanying drawings. The following description is intended to provide a general understanding of the method, apparatus and/or system described in the specification, but it is illustrative in purpose only and should not be construed as limiting the present disclosure.

In describing the present disclosure, detailed descriptions that are well-known but are likely to obscure the subject matter of the present disclosure will be omitted in order to avoid redundancy. The terminology used herein is defined in consideration of its function in the present disclosure, and may vary with an intention of a user and an operator or custom. Accordingly, the definition of the terms should be determined based on overall contents of the specification. The terminology used herein is for the purpose of describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
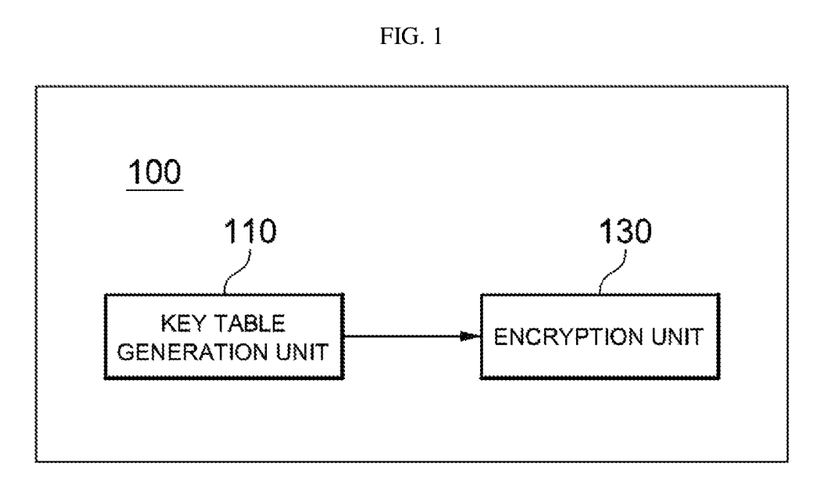
FIG. 1 is a block diagram illustrating an apparatus for encryption according to an exemplary embodiment of the present disclosure.

FIG. 1 is a block diagram illustrating an apparatus for encryption according to an exemplary embodiment of the present disclosure.

Referring to FIG. 1, an apparatus for encryption 100 according to an exemplary embodiment of the present disclosure includes a key table generation unit 110 and an encryption unit 130.

The key table generation unit 110 generates random values derived from a seed value by using the seed value, and generates a key table including the generated random values.

The key table may represent a lookup table composed of random values derived from the seed value.

In addition, the seed value may represent an initial input value which is able to be represented in a bit string. For example, the seed value may include a cryptographic key, a counter value used in an operation mode of a block encryption, and an initialization vector composed of a random bit string.

Meanwhile, according to the exemplary embodiment of the present disclosure, the respective random values of the key table generated by the key table generation unit 110 may have sizes determined according to a size of an available memory that is used for encryption in a computing environment to which the apparatus for encryption 100 is applied.

The encryption unit 130 may encrypt a plain text data block by generating an encryption algorithm by repeatedly combining the key table generated by the key table generation unit 110 with a permutation function in a crossing manner, and using the generated encryption algorithm.

The permutation function may represent all types of functions that are configured to receive an input value and output a different value having the same length of the input value while being cryptographically secure. For example, the permutation function may be a block encryption algorithm, including an Advanced Encryption Standard (AES) algorithm, a Data Encryption Standard (DES) algorithm, an International Data Encryption (IDEA) algorithm, and a Blowfish algorithm.

Meanwhile, according to the exemplary embodiment of the present disclosure, the encryption unit 130 may repeatedly combine the key table with the permutation function in a crossing manner based on an Even-Mansour scheme as shown in Equation 1 below, in which a key value is substituted for the key table generated by the key table generation unit 110.

$$E(P)=F(P+k_0)+k_1 \qquad \text{[Equation 1]}$$

In this case, P is plain text data, F is a permutation function, and $k_0$ and $k_1$ represent key values.

In detail, the encryption unit 130 may generate an encryption algorithm by repeatedly combining r+1 key tables with r permutation functions in a crossing manner based on the Even-Mansour scheme described above (r is an integer and r≥1), in which r may be determined depending on a required level of security.

Figure 2:
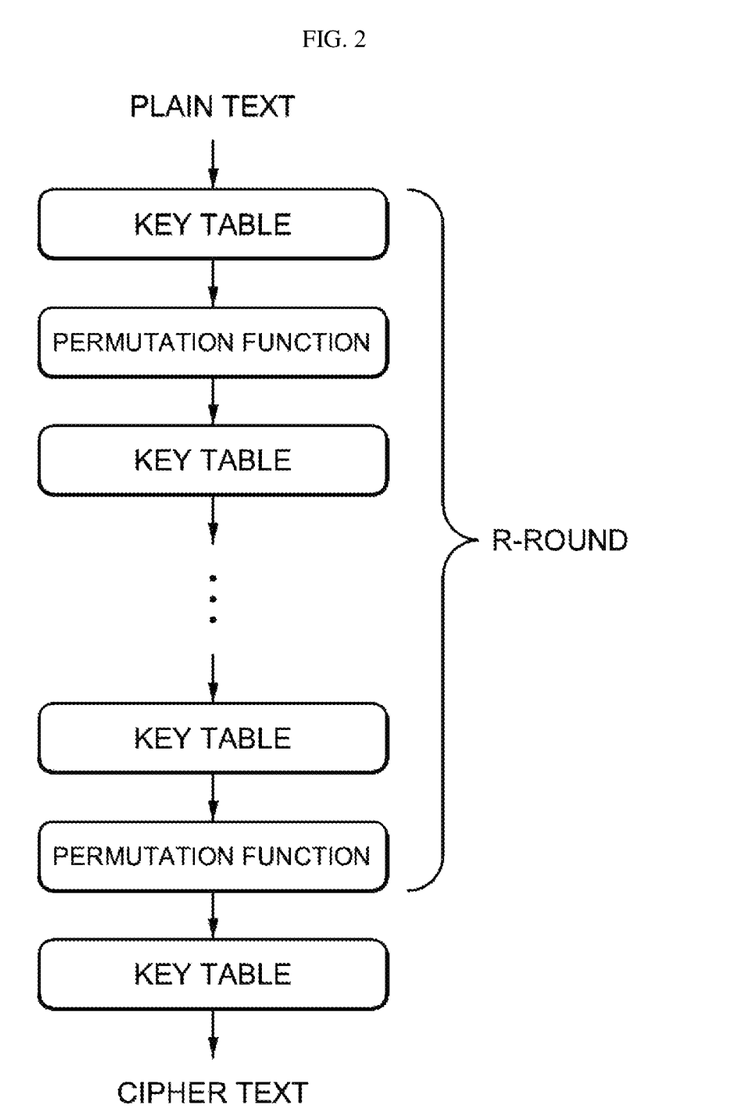
FIG. 2 is a diagram illustrating an example of a configuration of an encryption algorithm generated by an encryption unit.

In more detail, FIG. 2 is a diagram illustrating an example of a configuration of an encryption algorithm generated by the encryption unit 130.

Referring to FIG. 2, the encryption unit 130 may repeatedly combine r key tables with r permutation functions in a crossing manner such that a result value of the key table is input into the permutation function and a result value of the permutation function is input into the key table, and may combine with the key table once more, thereby generating an encryption algorithm.

Meanwhile, although the example of FIG. 2 illustrates that the same r+1 key tables are combined with the same r key tables, the present disclosure is not limited thereto.

For example, unlike the example shown in FIG. 2, all of the r+1 key tables may be different from each other, or the r+1 key tables may be partly different from each other. When r+1 key tables different from each other are used, the key table generation unit 110 may generate the r+1 key tables different from each other by using an input seed value. For example, when r+1 key tables of two different types are used, the key table generation unit 110 may generate two key tables from an input seed value.

Meanwhile, as with the key table, all of the r permutation functions may be different from each other, or partly different from each other, unlike the example shown in FIG. 2.

Figure 3:
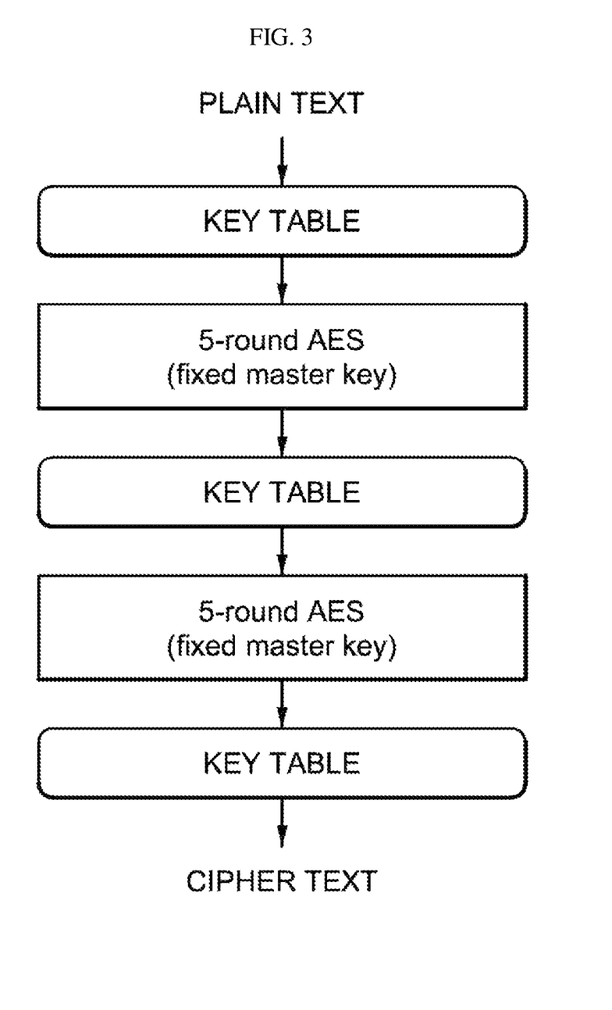
FIG. 3 is a diagram illustrating an example of a configuration of an encryption algorithm generated by using an Advanced Encryption Standard (AES) algorithm as a permutation function.

FIG. 3 is a diagram illustrating an example of a configuration of an encryption algorithm generated by using an AES algorithm as a permutation function.

Referring to FIG. 3, an encryption algorithm is generated by repeatedly combining three key tables with two identical AES algorithms each composed of five rounds, in a crossing manner.

In addition, each AES algorithm is configured to use a fixed value as an encryption key.

Meanwhile, although the example of FIG. 3 illustrates that the same key tables and the same AES algorithms are repeatedly combined, the present disclosure is not limited thereto. For example, as described above, three key tables different from each other, or two identical key tables and one different key table may be used, and one AES algorithm and another permutation function may be used.

Figure 4:
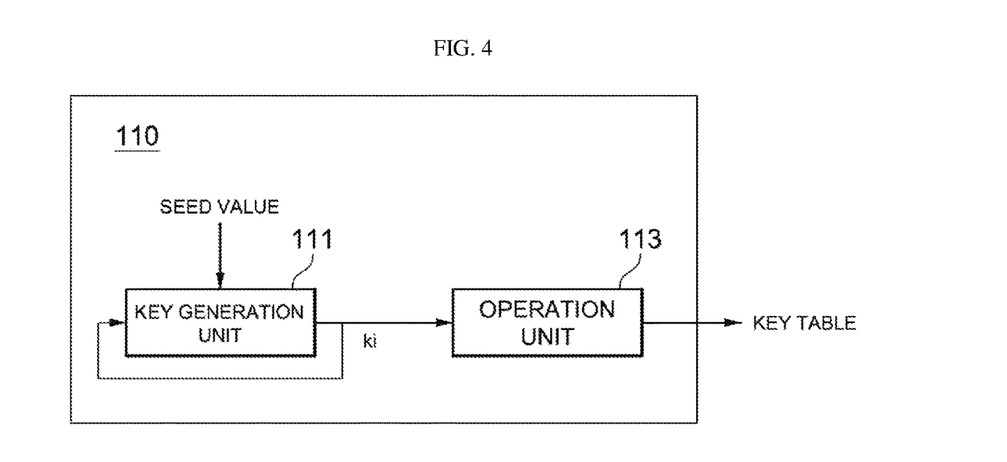
FIG. 4 is a detailed diagram illustrating a detailed configuration of a key table generation unit according to an exemplary embodiment of the present disclosure.

FIG. 4 is a diagram illustrating a detailed configuration of the key table generation unit 110 according to an exemplary embodiment of the present disclosure.

Referring to FIG. 4, the key table generation unit 110 may include a key generation unit 111 to generate a plurality of sub keys from a seed value and an operation unit 113 to generate a key table by using the respective sub keys.

In detail, the key generation unit 111 may generate a sub key by receiving a seed value, and repeatedly generate a new sub key from the sub key that was just generated. For example, when it is assumed that three sub keys are generated, the key generation unit 111 may generate a random number from an input seed value to generate a first sub key. Therefore, the key generation unit 111 may generate a random number from the generated first sub key to generate a second sub key, and generate a random number from the generated second sub key to generate a third sub key.

The operation unit 113 generates random values to form a key table from the respective sub keys generated from the key generation unit 111, and generates the key table including the generated random values. In detail, the operation unit 113 may generate random values by applying each sub key to a round function every round by using a round function that is configured to generate random values from input sub keys.

Figure 5:
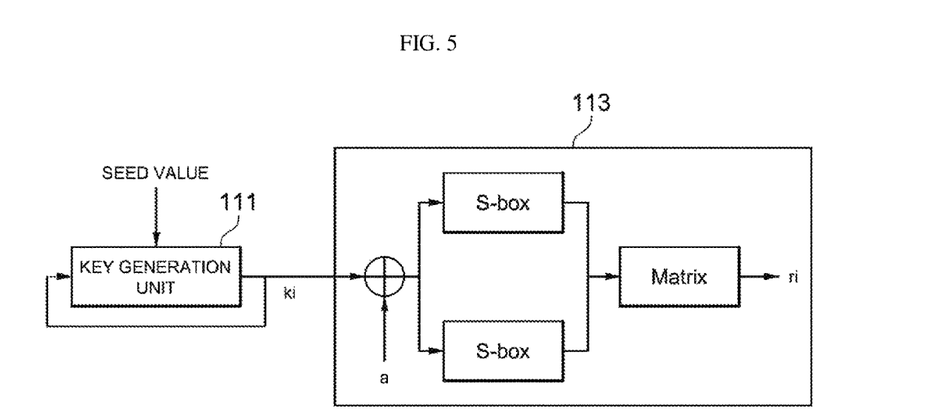
FIG. 5 is a diagram illustrating a round function used in an operation unit.

In detail, FIG. 5 is a diagram illustrating a round function used in the operation unit 113.

Referring to FIG. 5, the operation unit 113 performs an XOR operation on a sub key ki generated in the key generation unit 111 and a random value (a) having the same size as that of the sub key ki, and divides an XOR operation result into two parts that are then applied to S-boxes, respectively. Thereafter, the operation unit 113 performs a matrix operation on output result values of the two S-boxes to generate a random value ri. The matrix operation may be provided using various types of matrix operations having a property that may maximize a diffusion effect on an input value, for example, a Maximum Distance Separable (MDS) matrix.

Meanwhile, the generating of the key table performed by the key table generation unit 110 is not limited to FIGS. 4 and 5. For example, unlike the examples of FIGS. 4 and 5, the key table generation unit 110 may generate random values from a seed value by using various methods having a one-way property and generate a key table including the generated random values.

Meanwhile, according to the exemplary embodiment of the present disclosure, the key table generation unit 110 and the encryption unit 130 illustrated in FIG. 1 may be implemented on one or more computing devices including one or more processors and a computer readable recording medium connected to the processor. The computer readable recording medium may be provided inside or outside of the processor, and may be connected to the processor by generally known means. The processor in the computing device may allow the computing device to operate according to the exemplary embodiment described in this specification. For example, the processor may execute an instruction stored in the computer readable recording medium, and when the instruction stored in the computer readable recording medium is executed by the processor, operations according to the exemplary embodiments described in this specification are performed by the computing device.

Figure 6:
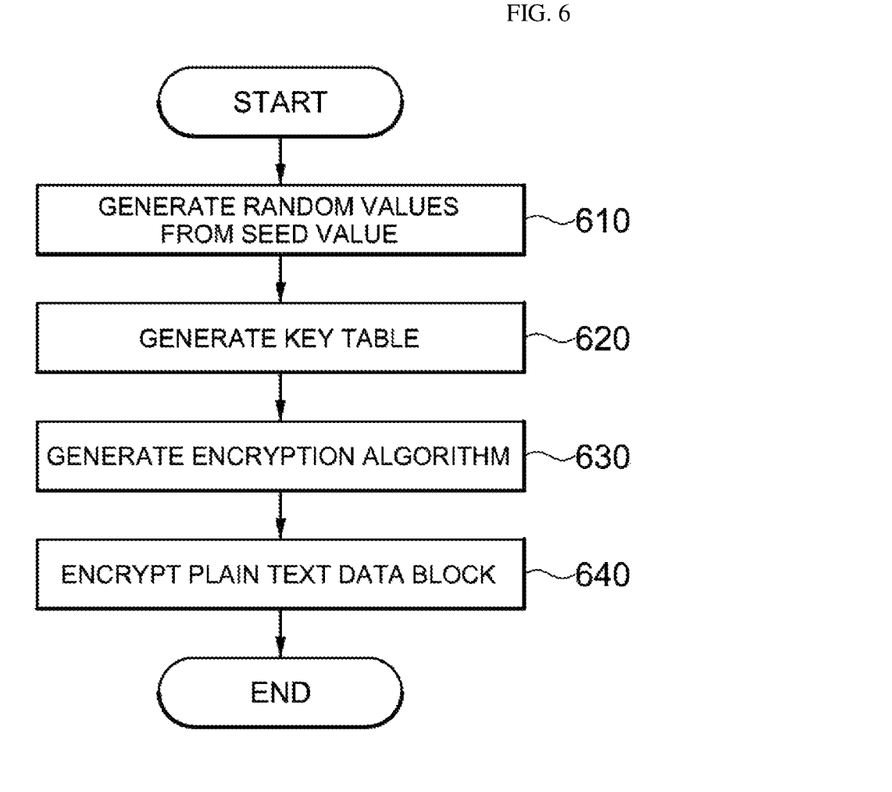
FIG. 6 is a flowchart showing a method for encryption according to an exemplary embodiment of the present disclosure.

FIG. 6 is a flowchart showing a method for encryption according to an exemplary embodiment of the present disclosure.

For example, the method illustrated in FIG. 6 may be performed by the apparatus for encryption 100 illustrated in FIG. 1

Referring to FIG. 6, the apparatus for encryption 100 generates random values derived from a seed value (S610).

Then, the apparatus for encryption 100 generates a key table including the generated random values (S620). In this case, sizes of the random values forming the key table may be determined according to a size of an available memory.

Then, the apparatus for encryption 100 generates an encryption algorithm by repeatedly combining the generated key table with a permutation function in a crossing manner (S630).

In detail, the apparatus for encryption 100 may generate an encryption algorithm by repeatedly combining r+1 key tables with r permutation functions in a crossing manner based on an Even-Mansour scheme, in which a key value is substituted for the key table. In this case, r may be determined depending on a required level of security.

In addition, all of the r+1 key tables may be identical to each other, but the present disclosure is not limited thereto. According to another exemplary embodiment of the present disclosure, all of the r+1 key tables may be different from each other, or some of the r+1 key tables may be different from each other.

Similarly, all of the r permutation functions may be identical to each other, but the present disclosure is not limited thereto. According to another exemplary embodiment of the present disclosure, all of the r permutation functions may be different from each other, or some of the r permutation functions may be different from each other.

Then, the apparatus for encryption 100 encrypts a plain text data block by using the generated encryption algorithm (640).

Meanwhile, in the flow chart shown in FIG. 6, the method is illustrated as being divided into a plurality of operations. However, at least one operation of the operations may be performed in a changed order, concurrently performed in combination with other operations, omitted, sub-divided, or one or more additional operations which are not illustrated in the diagram may be performed.

Meanwhile, the embodiments of the present disclosure may include a computer readable recording medium including a program to perform the methods described in the specification on a computer. The computer readable recording medium may include a program instruction, a local data file, a local data structure, or a combination of one or more of these. The medium may be designed and constructed for the present disclosure, or generally used in the computer software field. Examples of the computer readable recording medium include a hardware device constructed to store and execute a program instruction, for example, a magnetic media such as hard disks, floppy disks, and magnetic tapes, optical media such as compact disc read-only memories (CD-ROMs), and digital versatile discs (DVDs), magneto-optical media such as floptical disk, read-only memories (ROM), random access memories (RAM), and flash memories. In addition, the program instruction may include a machine code made by a compiler and a high-level language executable by a computer through an interpreter.

The above-described devices may be implemented using hardware components and software components. For example, the above modules of apparatus for encryption 100 may be implemented using hardware components. The hardware components may include a processor and a memory.

The processor may be a controller and an arithmetic logic unit, a digital signal processor, a microcomputer, a field programmable array, a programmable logic unit, a microprocessor or any other device capable of responding to and executing instructions in a defined manner such that the processor is programmed with instructions that configure the processing device as a special purpose computer configured to perform the embodiments of the present disclosure.

As is apparent from the above, without a great number of additional operations accompanying a conventional process to protect a cipher key, only a speed to access a key table is added with regard to the efficiency of an underlying function, and a variable design is ensured regardless of the size of data to be protected in an application environment, thereby providing an enhanced efficiency compared to the conventional white box implementation method.

It will be apparent to those skilled in the art that various modifications can be made to the above-described exemplary embodiments of the present disclosure without departing from the spirit or scope of the disclosure. Thus, it is intended that the present disclosure covers all such modifications provided they come within the scope of the appended claims and their equivalents.

What is claimed is:

1. An encryption apparatus comprising:
a key table generator configured to generate a plurality of pseudo-random values derived from a seed value, and generate a first key table comprising the plurality of generated pseudo-random values; and
an encryptor configured to generate an encryption algorithm by iteratively combining the generated first key table with a permutation function in a crossing manner, and encrypt a plain text data block using the generated encryption algorithm,
wherein the key table generator is further configured to determine a corresponding size for each of the plurality of pseudo-random values based on an amount of memory available for encryption, and generate the plurality of pseudo-random values based on the determined sizes for each of the plurality of pseudo-random values.

2. The apparatus for encryption of claim 1, wherein the seed value comprises a bit string.

3. The apparatus for encryption of claim 2, wherein the bit string comprises one among a cryptographic key, a counter value, and an initialization vector.

4. The apparatus for encryption of claim 1, wherein the iteratively combining the first key table with the permutation function in a crossing manner is based on an Even-Mansour scheme in which a key value is substituted for the key table.

5. The apparatus for encryption of claim 1, wherein the encryptor is further configured to generate the encryption algorithm by iteratively combining r+1 key tables (r is an integer and r≥1) with a plurality of r permutation functions in a crossing manner.

6. The apparatus for encryption of claim 5, wherein the r+1 key tables are identical.

7. The apparatus for encryption of claim 5, wherein each of the r+1 key tables is different.

8. The apparatus for encryption of claim 5, wherein a first key table of the r+1 key tables is identical to a second key table of the r+1 key tables, and the first key table is different from a third key table of the r+1 key tables.

9. The apparatus for encryption of claim 5, wherein each of the plurality of r permutation functions are identical.

10. The apparatus for encryption of claim 5, wherein each of the plurality of r permutation functions is different.

11. The apparatus for encryption of claim 5, wherein a first r permutation of the plurality of r permutation functions is identical to a second r permutation function of the plurality of r permutation functions, and the first r permutation function is different from a third r permutation function of the plurality of r permutation functions.

12. The apparatus for encryption of claim 1, wherein the permutation function comprises a block cipher algorithm.

13. A encryption method comprising:
generating pseudo-random values derived from a seed value;
generating a first key table comprising the generated pseudo-random values;
generating an encryption algorithm by iteratively combining the generated first key table with a permutation function in a crossing manner; and
encrypting a plain text data block using the generated encryption algorithm,
wherein the generating the pseudo-random values comprises:
determining a corresponding size for each of the plurality of pseudo-random values based on an amount of memory available for encryption; and
generating the plurality of pseudo-random values based on the determined sizes for each of the plurality of pseudo-random values.

14. The method for encryption of claim 13, wherein the seed value comprises a bit string.

15. The method for encryption of claim 14, wherein the bit string comprises one among a cryptographic key, a counter value, and an initialization vector.

16. The method for encryption of claim 13, wherein the iteratively combining is in a crossing manner based on an Even-Mansour scheme in which a key value is substituted for the first key table.

17. The method for encryption of claim 13, wherein the generating the encryption algorithm comprises iteratively combining r+1 key tables with r permutation functions in a crossing manner.

18. The method for encryption of claim 17, wherein each of the r+1 key tables is identical.

19. The method for encryption of claim 17, wherein each of the r+1 key tables is different.

20. The method for encryption of claim 17, a first key table of the r+1 key tables is identical to a second key table of the r+1 key tables, and the first key table is different from a third key table of the r+1 key tables.

21. The method for encryption of claim 17, wherein each of the plurality of r permutation functions are identical.

22. The method for encryption of claim 17, wherein each of the plurality of r permutation functions is different.

23. The method for encryption of claim 17, wherein a first r permutation of the plurality of r permutation functions is identical to a second r permutation function of the plurality of r permutation functions, and the first r permutation function is different from a third r permutation function of the plurality of r permutation functions.

24. The method for encryption of claim 13, wherein the permutation function comprises a block cipher algorithm.

25. A non-transitory computer readable recording medium having embodied thereon a program, which when executed by a processor of an encryption apparatus causes the encryption apparatus to execute an encryption method, the encryption method comprising:

generating pseudo-random values derived from a seed value
generating a first key table comprising the generated pseudo-random values;
generating an encryption algorithm by iteratively combining the generated first key table with a permutation function in a crossing manner; and
encrypting a plain text data block using the generated encryption algorithm,
wherein the generating the pseudo-random values comprises:
    determining a corresponding size for each of the plurality of pseudo-random values based on an amount of memory available for encryption; and
    generating the plurality of pseudo-random values based on the determined sizes for each of the plurality of pseudo-random values.

* * * * *